H. A. W. KLINKHAMER.
SECURING STABILITY FOR THE PARALLEL OPERATION OF TWO DIRECT CURRENT MACHINES.
APPLICATION FILED OCT. 16, 1917.
1,317,877.
Patented Oct. 7, 1919.
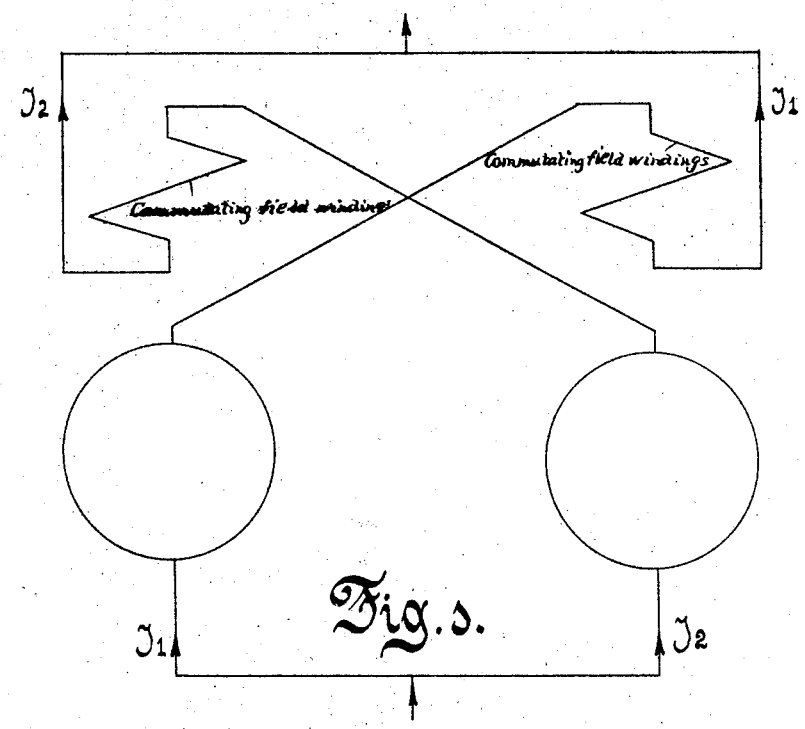
Fig. 1.
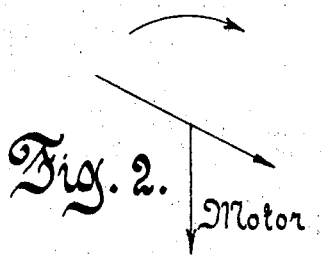
Fig. 2. Motor
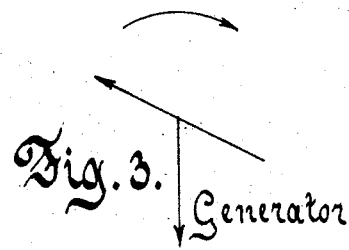
Fig. 3. Generator
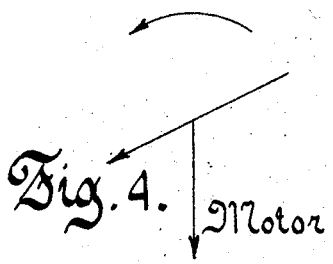
Fig. 4. Motor
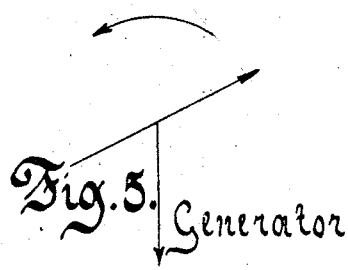
Fig. 5. Generator
Witnesses
Bertha Mueller
Claire Franck
Inventor
Hendrik Abraham Wijnand Klinkhamer
By:
his Attorney

UNITED STATES PATENT OFFICE.

HENDRIK ABRAHAM WIJNAND KLINKHAMER, OF DELFT, NETHERLANDS.

CONNECTION FOR SECURING STABILITY FOR THE PARALLEL OPERATION OF TWO DIRECT-CURRENT MACHINES.

1,317,877. Specification of Letters Patent. Patented Oct. 7, 1919.

Application filed October 16, 1917. Serial No 196,911.

*To all whom it may concern:*

Be it known that I, HENDRIK ABRAHAM WIJNAND KLINKHAMER, a subject of the Queen of the Netherlands, residing at Delft, Province of Zuid-Holland, Kingdom of the Netherlands, have invented certain new and useful Improvements in Connections for Securing Stability for the Parallel Operation of Two Direct-Current Machines, of which the following is a specification.

The invention consists in a connection for parallel operation of direct current machines, by which a disadvantage of this mode of working is avoided.

In operating direct current machines in parallel, in some cases, the distribution of the load will be unstable, so that working is impossible. Particularly with synchronously running machines this difficulty occurs.

Different means are known to overcome this difficulty; said means, however, all having their advantages and disadvantages.

Three of these means are mentioned here:

(1) Connecting resistances in series with the armatures.

The most serious disadvantage here is the continuous loss of energy.

(2) The use of compound winding. The chief disadvantage here is the necessity to change over the compound winding in reversing the direction of rotation.

(3) Displacing the brushes from the neutral zone in the direction of rotation. The working is quite similar to that of the compound winding. The difficulty is that in reversing the direction of rotation, the brushes must be displaced to the opposite side.

In connecting according to the present invention none of the difficulties of the different means mentioned above occur.

The invention consists in connecting the interpoles crosswise in such a manner that in each machine the interpoles are not excited by the armature current of the machine itself, but by the armature current of the other machine.

The invention will be more fully described and explained hereafter with reference to the accompanying drawing on which;

Figure 1 gives the connection diagrammatically,

Figs. 2, 3, 4, and 5 show the effect of underexciting the commutating poles in a single machine, for the different modes of operation. Underexcitation of the commutating poles will retard the commutation, in consequence whereof the direction of the armature field will be turned over a small angle in the direction of rotation of the armature. The shifting of the armature reaction is due to the slowness of the reversal of the current in the short circuited coils when the commutating field is underexcited.

Overexcitation of the commutating poles will acelerate the commutation, in consequence whereof the direction of the armature field will be turned over a small angle opposite to the direction of the rotation of the armature.

The displacing of the armature field from the neutral zone causes an additional electromotive force (E. M. F.) in the armature, owing to the fact, that the cross component of the armature field increases or decreases the main field. The direction of this additional E. M. F is given by the following rule:

Underexcitation of the interpoles tends to decrease, and overexcitation to increase the armature current—

In order to show that this rule can be applied generally the different modes of operation will be examined separately.

The curved arrow (see Figs. 2-5) indicates the direction of rotation of the armature; the vertical arrow indicates the main field and the third arrow the armature field. The diagrams are drawn for underexcitation. In accordance with the above mentioned rule, the arrows representing the armature field are displaced over a small angle from the neutral zone in the direction of rotation of the armature.

From the figures of the drawing it is apparent, that for both directions of rotation, the vertical component of the armature field increases the main field in motoring and decreases it in generating. For motoring as well as for generating the additional E. M. F. therefore tends to diminish the armature current.

This proves that the first part of the above mentioned rule is right. In case of overexcitation the displacement from the neutral zone and therefore also the vertical cross component of the armature field will have the opposite direction as indicated in Figs. 2-5. It is apparent that the additional E. M. F. then also will have an opposite direction, and that consequently also the second part of the rule is right.

Now coming to the connection of the invention, represented in Fig. 1 let the armature current I, of the left machine be less than the armature current I² of the right machine. The commutating pole of the left machine will then be overexcited, that of the right machine underexcited. In accordance with the above mentioned rule the additional E. M. F. in the armature of the left tends to increase the current, that in the right machine tends to diminish the current. Thus the additional E. M. F.'s counteract the inequality, i. e., they have a stabilizing effect.

These E. M. F.'s act only in the case of inequality whereas the three known means consist in inserting additional E. M. F.'s acting not only when the currents are unequal but also when they are equal.

In the connection according to the present invention it is the sum of the additional E. M. F.'s that counteracts the inequality, whereas in the before mentioned cases it was their difference.

Thus in the connection of the invention, a more favorable use is made of the additional E. M. F.'s.

In contrast with the stabilizing by means of a compound winding or by displacing the brushes, all reversing and manipulation is avoided. Also there is no loss of energy as in the cases of resistance connected in series with the armature.

It is also an advantage, that the invention can be applied to existing machines without requiring any modification of the construction, and also that the transition from connection in series to connection in parallel of the armatures can be effected without requiring any additional change in the scheme of connections.

What I claim is:

In combination, a plurality of dynamo electric machines, each machine having an armature, commutating field windings and commutating poles, and an electrical connection from the armature of each machine to the commutating field winding of another machine whereby the commutating winding of each machine is adapted to be excited by the armature current of another machine.

In testimony whereof I have hereunto set my hand.

HENDRIK ABRAHAM WIJNAND KLINKHAMER.

Witnesses:
A. ELBERTS DAYER,
CASSEL ERICH VAN DORKEN.